(12) United States Patent
Yang et al.

(10) Patent No.: US 11,622,406 B2
(45) Date of Patent: Apr. 4, 2023

(54) DUAL CONNECTIVITY METHOD AND ACCESS NETWORK DEVICE

(71) Applicant: HUAWEI TECHNOLOGIES CO., LTD., Guangdong (CN)

(72) Inventors: Xiaodong Yang, Shenzhen (CN); Wei Quan, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 325 days.

(21) Appl. No.: 16/457,072

(22) Filed: Jun. 28, 2019

(65) Prior Publication Data
US 2019/0327782 A1   Oct. 24, 2019

Related U.S. Application Data

(63) Continuation of application No. PCT/CN2017/119034, filed on Dec. 27, 2017.

(30) Foreign Application Priority Data

Dec. 30, 2016   (CN) .......................... 201611269925.1

(51) Int. Cl.
*H04W 76/16* (2018.01)
*H04W 88/10* (2009.01)

(52) U.S. Cl.
CPC ............ *H04W 76/16* (2018.02); *H04W 88/10* (2013.01)

(58) Field of Classification Search
CPC ...... H04W 48/18; H04W 76/16; H04W 88/10
(Continued)

(56) References Cited

U.S. PATENT DOCUMENTS

2007/0293224 A1* 12/2007 Wang ................ H04W 36/0011
455/436
2012/0263119 A1* 10/2012 Monogioudis ........ H04W 28/24
370/329
(Continued)

FOREIGN PATENT DOCUMENTS

CN         105307259 A      2/2016
CN         105338572 A      2/2016
(Continued)

OTHER PUBLICATIONS

LG Electronics (Discussion on SeNB addition and modification), 3GPP, R3-140703, 3 pages (Year: 2014).*
(Continued)

*Primary Examiner* — Christopher M Crutchfield
*Assistant Examiner* — Jean F Voltaire
(74) *Attorney, Agent, or Firm* — Fish & Richardson P.C.

(57) ABSTRACT

The present disclosure relates to dual connectivity methods. In one example method, a first access network device sends a request message to a second access network device, where the request message is used to request the second access network device to serve as a secondary access network device of a terminal served by the first access network device. Then, the first access network device receives an acknowledgment message from the second access network device, where the acknowledgment message is used to acknowledge to the first access network device that the second access network device agrees to serve as the secondary access network device of the terminal.

20 Claims, 4 Drawing Sheets

(58) Field of Classification Search
USPC .......................................................... 370/254
See application file for complete search history.

(56) References Cited

U.S. PATENT DOCUMENTS

| | | | | |
|---|---|---|---|---|
| 2014/0004863 | A1* | 1/2014 | Zhang | H04W 36/0033 |
| | | | | 455/444 |
| 2015/0095413 | A1* | 4/2015 | Wei | H04L 67/02 |
| | | | | 709/203 |
| 2016/0029421 | A1 | 1/2016 | Wang et al. | |
| 2016/0227459 | A1* | 8/2016 | Fujishiro | H04W 36/0079 |
| 2017/0339688 | A1* | 11/2017 | Singh | H04W 72/048 |
| 2018/0352457 | A1 | 12/2018 | Kim et al. | |
| 2019/0037409 | A1* | 1/2019 | Wang | H04W 88/14 |
| 2019/0386965 | A1 | 12/2019 | Ryoo et al. | |

FOREIGN PATENT DOCUMENTS

| | | |
|---|---|---|
| EP | 3506718 A1 | 7/2019 |
| WO | 2015020449 A1 | 2/2015 |
| WO | 2016021890 A1 | 2/2016 |
| WO | 2016060483 A1 | 4/2016 |
| WO | 2016192636 A1 | 12/2016 |

OTHER PUBLICATIONS

Office Action issued in Chinese Application No. 201611269925.1 dated Jan. 6, 2020, 20 pages (with English translation).
Extended European Search Report issued in European Application No. 17888992.9 dated Nov. 7, 2019, 7 pages.
LG Electronics Inc., "CR for SeNB UE-AMBR for dual connectivity", 3GPP TSG-RAN WG3 Meeting #89bis,NEC, R3-152338, Oct. 10, 2015, 21 pages.
Huawei, HiSilicon, "Slice Availability and Discovery in RAN", 3GPP TSG-RAN WG2 Meeting #96,R2-167586, Nov. 5, 2016, 4 pages.
Itri, "Further Discussion LWA Procedure", 3GPP TSG-RAN WG2 Meeting#9Ibis, R2-154396, Sep. 25, 2015, 4 pages.
Nokia, Alcatel-Lucent Shanghai Bell "RAN Selection of CN Entity based on Network Slicing",3GPP TSG-RAN WG3 Meeting #92, R3-161357, May 13, 2016, 5 pages.
LG Electronics Inc., "Discussion on support of network slicing in RAN", 3GPP TSG-RAN WG3 Meeting #94, R3-162675,Nov. 5, 2016, 4 pages.
Office Action issued in Chinese Application No. 201910782746.5 dated Mar. 19, 2020, 20 pages(With English Translation).
EPO Communication pursuant to Article 94(3) EPC issued in European Application No. 17888992.9 dated Sep. 24, 2020, 7 pages.
3GPP TS 33.401 V14.0.0 (Sep. 2016), "3rd Generation Partnership Project; Technical Specification Group Services and System Aspects; 3GPP System Architecture Evolution (SAE); Security architecture (Release 14)," Sep. 2016, 152 pages.
3GPP TS 36.300 V13.5.0 (Sep. 2016), "3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Technical Specification, Sep. 2016, 313 pages.
3GPP TS 36.331 V14.0.0 (Sep. 2016), "3rd Generation Partnership Project; Technical Specification Group Radio Access Network; Evolved Universal Terrestrial Radio Access (E-UTRA); Radio Resource Control (RRC); Protocol specification (Release 14)," Sep. 2016, 643 pages.
3GPP TS 36.413 V14.0.0 (Sep. 2016), "3rd Generation Partnership Project; Technical Specification Group Radio Access Network; Evolved Universal Terrestrial Radio Access Network (E-UTRAN); S1 Application Protocol (S1AP) (Release 14)," Sep. 2016, 333 pages.
3GPP TS 36.423 V14.0.0 (Sep. 2016), "3rd Generation Partnership Project; Technical Specification Group Radio Access Network; Evolved Universal Terrestrial Radio Access Network (E-UTRAN); X2 application protocol (X2AP) (Release 14)," Sep. 2016, 239 pages.
PCT International Search Report and Written Opinion issued in International Application No. PCT/CN2017/119034 dated Mar. 26, 2018, 16 pages (with English translation).
R3-140703—LG Electronics Inc., "Discussion on SeNB addition and modification," 3GPP TSG-RAN WG3 Meeting #83bis, San Jose Del Cabo, Mexico, Mar. 31-Apr. 4, 2014, 3 pages.

* cited by examiner

DUAL CONNECTIVITY METHOD AND ACCESS NETWORK DEVICE

CROSS-REFERENCE TO RELATED APPLICATIONS

This application is a continuation of International Application No. PCT/CN2017/119034, filed on Dec. 27, 2017, which claims priority to Chinese Patent Application No. 201611269925.1, filed on Dec. 30, 2016. The disclosures of the aforementioned applications are hereby incorporated by reference in their entireties.

TECHNICAL FIELD

This application relates to the mobile communications field, and in particular, to dual connectivity to both a Long Term Evolution (LTE) system and a 5th generation mobile communications technology (5G) system.

BACKGROUND

In a 5G technology of the 3rd Generation Partnership Project (3GPP), all wireless communication network resources are classified into different resource groups based on transmission characteristics of different services, and one resource group is referred to as one network slice (slice).

Figure 1:
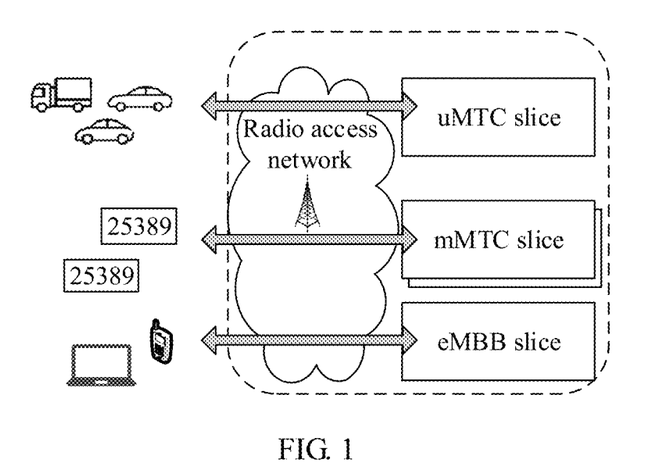
FIG. 1 is a schematic diagram of an application scenario of a network slice.

As shown in FIG. 1, a network may be divided, based on service transmission characteristics, into three types of slices, namely, an ultra-reliable and low-latency machine type communications (uMTC) service slice, a massive machine type communication (mMTC) service slice, and an enhanced mobile broadband (eMBB) service slice.

Different types of slices serve different services to better meet service requirements. In FIG. 1, a service on the uMTC slice is a low-latency and high-reliability service, and is mainly applied to communication between things in the Internet of Things, for example, unmanned driving, a remote medical surgery, and transportation safety. A service on the mMTC slice is a service insensitive to a data throughput and a data transmission delay, and relates to a large quantity of user equipments (UE), for example, intelligent water and electricity meters. A service on the eMBB slice is a service requiring a huge throughput and having a higher data rate and wider mobile broadband, for example, fast transmission of an ultra-high-definition video.

Currently, deployment of dual connectivity to both LTE and 5G is also under discussion when 5G deployment is discussed. The dual connectivity to both LTE and 5G means that UE is connected to both an LTE access network device and a 5G access network device, where one access network device is a master access network device, the other access network device is a secondary access network device, and the UE establishes a connection to a same core network by using the master access network device and the secondary access network device.

Although the UE can establish a connection to only one core network, the access network devices each may be connected to two or more core network devices concurrently. When the master access network device is connected to a plurality of core networks, no method for determining, by the secondary access network device, a core network corresponding to UE is provided in the prior art, and consequently, the secondary access network device cannot be connected to the core network corresponding to the UE. Therefore, dual connectivity cannot be implemented.

SUMMARY

Embodiments of this application provide a dual connectivity method and an access network device, so as to implement dual connectivity to both an LTE system and a 5G system.

According to a first aspect, an embodiment of this application provides a dual connectivity method. First, a first access network device first sends a request message to a second access network device, where the request message is used to request the second access network device to serve as a secondary access network device of a terminal served by the first access network device. Then the first access network device receives an acknowledgment message from the second access network device, where the acknowledgment message is used to acknowledge to the first access network device that the second access network device agrees to serve as the secondary access network device of the terminal.

According to a second aspect, an embodiment of this application provides a first access network device. The first access network device includes a transmitter and a receiver. The transmitter is configured to send a request message to a second access network device, where the request message is used to request the second access network device to serve as a secondary access network device of a terminal served by the first access network device. The receiver is configured to receive an acknowledgment message from the second access network device, where the acknowledgment message is used to acknowledge to the first access network device that the second access network device agrees to serve as the secondary access network device of the terminal.

In this embodiment of this application, the first access network device sends the request message to the second access network device, where the request message is used to request the second access network device to serve as the secondary access network device of the terminal served by the first access network device, so that dual connectivity to both an LTE network and a 5G network is implemented.

In an example, the acknowledgment message further includes at least one of an identifier of a downlink tunnel between the second access network device and the core network or an identifier of an uplink tunnel between the second access network device and the core network.

In this embodiment of this application, the first access network device receives the acknowledgment message from the second access network device, where the message includes the identifier of the downlink tunnel between the second access network device and the core network and the identifier of the uplink tunnel between the second access network device and the core network, so that the first access network device learns a downlink data and/or command transmission tunnel of the second access network device and learns an uplink data transmission tunnel of the second access network device.

In an example, the request message further includes an identifier of a core network device corresponding to the first access network device.

In this embodiment of this application, the second access network device receives the request message from the first access network device, where the message includes an identifier of a core network device corresponding to the first access network device, so that the second access network device can learn an identifier of a core network device corresponding to UE. Therefore, when the first access network device is connected to a plurality of core networks, the second access network device can determine a core network that has established a connection to the terminal, so that the second access network device is connected to the core network that has established a connection to the terminal.

In an example, the request message further includes one or more of the following quality of service QoS attributes: a security level, a service continuity level, a delay level, a flow priority indicator FPI, a reflective quality of service indicator RQI, a packet drop priority indicator PDPI, and a traffic filter template TFT.

In an example, the request message further includes an identifier of a network slice accessed by the terminal, and the identifier of the network slice is corresponding to one or more of the QoS attributes.

According to a third aspect, an embodiment of this application provides a dual connectivity method. First, a first access network device first receives a request message from a second access network device, where the request message is used to request the first access network device to serve as a secondary access network device of a terminal served by the second access network device. Then, the first access network device sends an acknowledgment message to the second access network device, where the acknowledgment message is used to acknowledge to the second access network device that the first access network device agrees to serve as the secondary access network device of the terminal.

According to a fourth aspect, an embodiment of this application provides a first access network device. The first access network device includes a receiver and a transmitter. The receiver is configured to receive a request message from a second access network device, where the request message is used to request the first access network device to serve as a secondary access network device of a terminal served by the second access network device. The transmitter is configured to send an acknowledgment message to the second access network device, where the acknowledgment message is used to acknowledge to the second access network device that the first access network device agrees to serve as the secondary access network device of the terminal.

In this embodiment of this application, the first access network device receives the request message from the second access network device, where the request message is used to request the first access network device to serve as the secondary access network device of the terminal served by the second access network device, so that dual connectivity to both an LTE network and a 5G network is implemented.

In an example, the acknowledgment message further includes at least one of an identifier of a downlink tunnel between the first access network device and the core network or an identifier of an uplink tunnel between the first access network device and the core network.

In an example, the request message further includes an identifier of a core network device corresponding to the second access network device.

In an example, the request message further includes one or more of quality of service QoS attributes: a security level, a service continuity level, a delay level, a flow priority indicator FPI, a reflective quality of service indicator RQI, a packet drop priority indicator PDPI, and a traffic filter template TFT.

In an example, the request message further includes an identifier of a network slice accessed by the terminal, and the identifier of the network slice is corresponding to one or more of the QoS attributes.

According to the embodiments of this application, the first access network device receives the request message from the second access network device, to request the first access network device to serve as the secondary access network device of the terminal served by the second access network device, and the first access network device sends the acknowledgment message to the second access network device, to determine that the first access network device agrees to serve as the secondary access network device, so that dual connectivity to both an LTE network and a 5G network is implemented.

DESCRIPTION OF EMBODIMENTS

The following describes technical solutions of embodiments in this application with reference to accompanying drawings.

Figure 2:
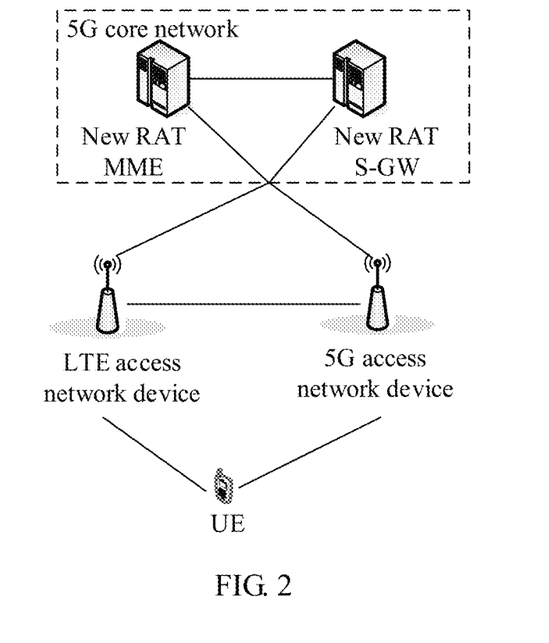
FIG. 2 is a schematic diagram of dual connectivity to both an LTE access network device and a 5G access network device.

FIG. 2 is a schematic diagram of dual connectivity between UE and an LTE access network device and between the UE and a 5G access network device.

The dual connectivity between UE and an LTE access network device and between the UE and a 5G access network device means that the UE establishes a connection to a same core network by using the LTE access network device and the 5G access network device. The core network may be an LTE core network, or may be a 5G core network. One of the LTE access network device and the 5G access network device is a master access network device, and the other access network device is a secondary access network device.

The user equipment UE in this application may be user equipment in various forms, including a mobile station (MS), a terminal, terminal equipment, and the like. For ease of description, in this application, the devices mentioned above are collectively referred to as user equipment UE. The access network devices in this application are apparatuses deployed in a radio access network to provide a wireless communication function for the UE. The access network devices may include a macro base station, a micro base station, a relay node, an access point, and the like that are in various forms.

In FIG. 2, the UE may establish a connection to the 5G core network (new radio access technology core net, New RAT CN) by using the LTE access network device, or may establish a connection to the 5G core network by using the 5G access network device, to implement dual connectivity. FIG. 2 shows an example in which the UE establishes dual connectivity to the 5G core network by using both the LTE access network device and the 5G access network device. Alternatively, the UE may establish dual connectivity to the LTE core network by using both the LTE access network device and the 5G access network device.

As shown in FIG. 2, the LTE access network device establishes a connection to the 5G core network through an eS1-U/1A UP interface, the 5G access network device establishes a connection to the 5G core network through an S1-C/S1-U interface, and the LTE access network device is connected to the 5G access network device through an eX2-U/3C UP interface.

In FIG. 2, because both the LTE access network device and the 5G access network device are connected to only a same core network (New RAT CN), data between the UE and the core network may be transmitted by using the LTE access network device and by using the 5G access network device. In this connectivity manner, whether the LTE access network device is used as a master access network device and the 5G access network device is used as a secondary access network device, or the LTE access network device is used as a secondary access network device and the 5G access network device is used as a master access network device, the secondary access network device can determine a core network corresponding to the UE. This is because the master access network device is connected to only one core network, and core networks corresponding to all UEs served in a coverage area of the master access network device are the same.

Figure 3:
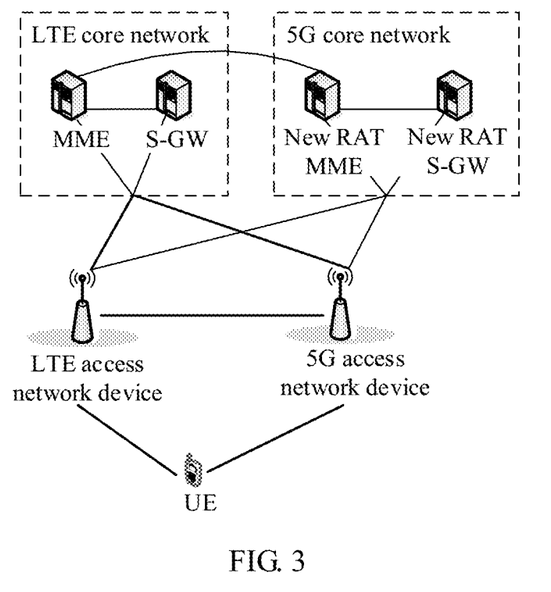
FIG. 3 is a schematic diagram of an application scenario of dual connectivity to both an LTE system and a 5G system according to an embodiment of this application.

However, for a case in which the master access network device is connected to a plurality of core networks, for example, a case in which the master access network device is connected to the LTE core network, that is, an evolved packet core (EPC) network, and the 5G core network, that is, a new radio access technology core network (New RAT CN), referring to FIG. 3, no method can enable the secondary access network device to determine a core network corresponding to the UE, so as to implement dual connectivity.

FIG. 3 is a schematic diagram of an application scenario of dual connectivity to both an LTE access network device and a 5G access network device according to an embodiment of this application. FIG. 3 shows a case in which the LTE access network device and the 5G access network device each is connected to an LTE core network and a 5G core network, that is, a case in which the LTE access network device is connected to both the LTE core network (EPC) and the 5G core network (New RAT CN) and the 5G access network device is also connected to both the LTE core network (EPC) and the 5G core network.

In FIG. 3, it is assumed that the LTE access network device is a master access network device, the 5G access network device is a secondary access network device, UE establishes a connection to the LTE core network (EPC) by using the LTE access network device, and the UE also needs to establish a connection to the LTE core network (EPC) by using the 5G access network device. However, the 5G access network device is connected to both the LTE core network (EPC) and the 5G core network (New RAT CN). Therefore, in the prior art, when transmitting uplink data from the UE, the 5G access network device serving as the secondary access network device cannot determine a core network corresponding to the UE, to be specific, cannot determine whether to transmit the uplink data to the LTE core network (EPC) or the 5G core network (New RAT CN). In addition, the 5G access network device serving as the secondary access network device cannot correctly receive downlink data because the 5G access network device is connected to both the LTE core network (EPC) and the 5G core network (New RAT CN). Therefore, the 5G access network device serving as the secondary access network device cannot determine whether to receive the downlink data through a data interface of the LTE core network (EPC) or through a data interface of the 5G core network (New RAT CN).

The following describes in detail how the secondary access network device determines, according to this embodiment of this application, a core network to which the UE establishes a connection, so that the UE implements dual connectivity to both the LTE access network device and the 5G access network device.

Figure 4:
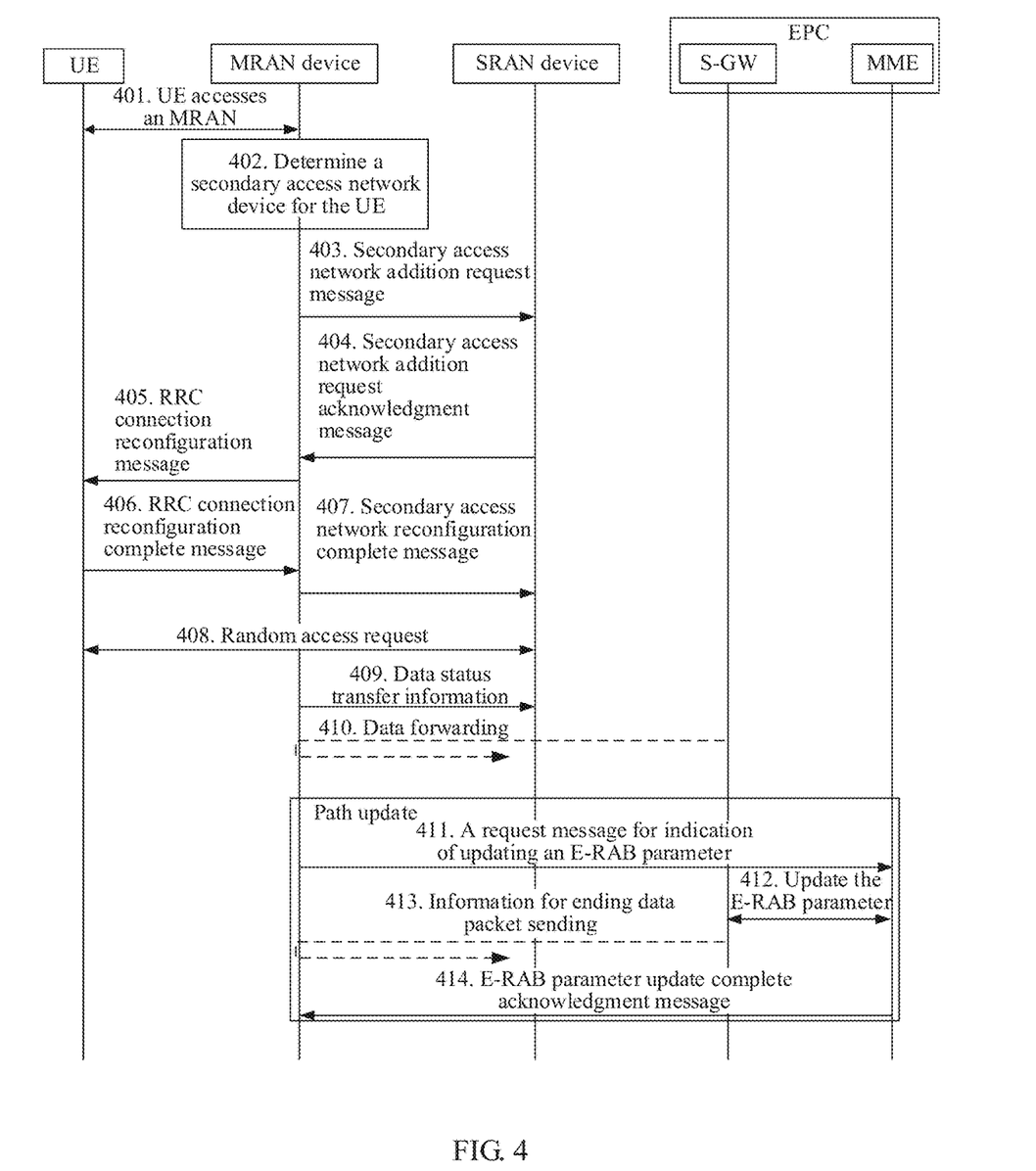
FIG. 4 is a schematic diagram of a method for establishing dual connectivity to both an LTE system and a 5G system according to an embodiment of this application.

FIG. 4 is a schematic diagram of a method for establishing dual connectivity to both an LTE system and a 5G system. FIG. 4 shows an example in which UE establishes a connection to an LTE core network (EPC). Actually, the UE may alternatively establish a connection to a 5G core network (New RAT CN). The two methods are the same, and details are not described herein.

Step 401: The UE sends a random access request, attempts to access a network by sending a random access preamble, and establishes a signaling connection to a master access network (MRAN) device, so that the UE accesses the master access network.

Step 402: The master access network MRAN device determines a secondary access network (SRAN) device for the UE.

In an example, the UE generates a measurement report through downlink measurement. The measurement report includes at least a quantity of neighboring cells (for example, 6), signal quality of each neighboring cell (for example, power of a received signal), and the like. The UE sends the measurement report to the master access network MRAN device, and the master access network MRAN device determines, according to a preset matching rule, a secondary access network device for the UE from access network devices indicated in the measurement report. For example, if the measurement report includes an access network device closest to the UE which is an xx access network device, and the preset matching rule is that the access network device closest to the UE is used as the secondary access network device, then the master access network MRAN device determines for the UE that the secondary access network device is the xx access network device.

Step 403: The master access network MRAN device sends a request message to the secondary access network SRAN device. For example, the request message is a secondary access network device addition request (SRAN Addition Request) message, the secondary access network addition request (SRAN Addition Request) message is used to request the secondary access network SRAN device to serve as a secondary access network device of the UE served by the master access network device, and the secondary access network addition request (SRAN Addition Request) message carries information about a core network connected to the master access network device.

The following describes by using an example in which the request message sent by the master access network MRAN device to the secondary access network SRAN device is a secondary access network addition request message SRAN Addition Request message.

Specifically, when sending a secondary access network device addition request message to another access network device, the master access network MRAN device notifies the another access network device of an identifier (ID) of a core network device to which the master access network device is connected, so that after the another access network device agrees to serve as the secondary access network device of the UE, the another access network device can learn the identifier of the core network device to which the master access network MRAN device is connected, that is, learn an identifier of a core network device corresponding to the UE.

In an example, the information about the core network includes the identifier of the core network device to which the master access network device is connected. Further, the information about the core network further includes a type of the core network, that is, whether the core network is an LTE core network or a 5G core network.

In an example, the secondary access network addition request (SRAN Addition Request) message further includes one or more of the following quality of service (QoS) attributes:

a security level, a service continuity level, a delay level, a flow priority indicator (FPI), a reflective quality of service indicator (RQI), a packet drop priority indicator (PDPI), and a traffic filter template (TFT). The security level is a security level of the UE. For example, the security level of the UE is a high security level. The service continuity level is a continuity level of a service supported by the UE, and may be represented by a data transmission interruption interval. For example, the data interruption interval is 1 ms. The delay level is a delay level of a service supported by the UE. For example, the service supported by the UE is a low-delay service.

The secondary access network addition request (SRAN Addition Request) message sent by the master access network MRAN device to the secondary access network SRAN device includes the foregoing parameters, to notify the secondary access network SRAN device of the quality of service attribute of the UE, so that the secondary access network SRAN device can determine whether the secondary access network SRAN device can meet a requirement of the UE, for example, whether the security level, the service continuity level, and the delay level of the secondary access network SRAN device can meet the requirement of the UE.

In another example, the secondary access network addition request (SRAN Addition Request) message further includes a slice identifier (slice ID) of the UE.

Specifically, an operation administration and maintenance (OAM) device in a network configures a QoS attribute corresponding to a network slice ID for each access network device, including a secondary access network SRAN device, as shown in Table 1.

TABLE 1

| Slice ID | Access delay | Service interruption interval | Data loss rate |
| --- | --- | --- | --- |
| 0001 | An access delay level is required to be lower than 10 ms | A service interruption interval is required to be less than 5 ms | Service reliability is that the data loss rate is 10e−9 |
| 0010 | Not required | A service interruption interval is required to be less than 1 ms | Not required |
| ... | | | |

In Table 1, QoS attributes corresponding to a slice ID 0001 include: (1) An access delay level is required to be lower than 10 ms; (2) A service interruption interval is required to be less than 5 ms; and (3) Service reliability is that a data loss rate is 10e−9. A person skilled in the art may understand that a specific value in Table 1 is merely an example.

The master access network MRAN device adds, to the SRAN Addition Request message sent by the secondary access network SRAN device, a slice ID corresponding to a bearer of the UE. The secondary access network device determines a QoS attribute of the bearer of the UE based on the slice ID, to perform data transmission on the bearer based on the QoS attribute.

Step 404: The secondary access network SRAN device sends an acknowledgment message to the master access network MRAN device. For example, the acknowledgment message is a secondary access network addition request acknowledgment (SRAN Addition Request Acknowledge) message, and the message carries information that the secondary access network device agrees to serve as the secondary access network device of the UE or information that the secondary access network device does not agree to serve as the secondary access network device of the UE.

The following describes by using an example in which the acknowledgment message sent by the secondary access network SRAN device to the master access network MRAN device is the secondary access network addition request acknowledgment message SRAN Addition Request Acknowledge message.

In an example, the secondary access network device addition request acknowledgment message includes an identifier of a downlink tunnel (DL GTP Tunnel Endpoint) between the secondary access network device and the core network (which herein refers to a core network to which the master access network device is connected, for example, an EPC).

Further, the secondary access network device addition request acknowledgment message may further include an identifier of an uplink tunnel between the secondary access network device and the core network.

There are a plurality of information transmission tunnels between the access network device and the core network, for example, 10 tunnels. The secondary access network device addition request acknowledgment message sent by the secondary access network SRAN device to the master access network MRAN device includes at least one of the identifier of the downlink tunnel or the identifier of the uplink tunnel, to notify the master access network device of a transmission tunnel of at least one of a downlink data or command, and to notify the master access network device of an uplink data transmission tunnel.

Step 405: The master access network MRAN device sends an RRC message to the UE, and adds related information of the secondary access network SRAN device to the RRC message. For example, if the master access network MRAN device is an LTE access network device, the RRC message is an RRC connection reconfiguration (RRC Connection Reconfiguration) message.

In an example, the RRC message includes an identifier of the secondary access network SRAN device. Further, the RRC message includes a secondary access network SRAN device type, for example, an LTE access network device or a 5G access network device.

In another example, the RRC message further includes an air interface resource of the secondary access network SRAN device, for example, a frequency and a bandwidth that are corresponding to the secondary access network device.

Step 406: The UE returns an RRC configuration complete message to the master access network MRAN device. For example, the RRC configuration complete message is an RRC connection reconfiguration complete (RRC Connection Reconfiguration Complete) message. Further, the RRC configuration complete message may carry a slice identifier (ID) of the UE, a slice type of the UE, and the like.

Step 407: The master access network MRAN device returns a secondary access network device reconfiguration complete (SRAN Reconfiguration Complete) message to the secondary access network SRAN device, where the secondary access network device reconfiguration complete (SRAN Reconfiguration Complete) message is used to notify the secondary access network SRAN device that the UE has configured the secondary access network device as the secondary access network device of the UE.

In an example, the secondary access network device reconfiguration complete (SRAN Reconfiguration Complete) message carries an identifier (ID) of the UE. Further, the secondary access network device reconfiguration complete (SRAN Reconfiguration Complete) message may carry a slice identifier (ID) of the UE, a slice type of the UE, and the like.

RRC connection reconfiguration aims at modifying an RRC connection, for example, establishing/modifying/releasing a resource block (RB), performing handover, preparing/modifying/releasing measurement, and the like, through the RRC connection reconfiguration. In this embodiment of this application, the UE accesses the secondary access network device through the RRC connection reconfiguration.

Step 408: The UE initiates a random access request to the secondary access network SRAN device to obtain synchronization, and the secondary access network SRAN device allocates a unique cell radio network temporary identifier (C-RNTI) to the UE, so that the UE accesses the secondary access network SRAN device.

The cell radio network temporary identifier C-RNTI is a dynamic identifier allocated by the access network device to the UE, uniquely identifies UE served by a cell air interface, and is valid only when the UE is in a connected mode.

It should be noted that after the UE accesses the secondary access network device, that is, after step 408, and before the core network device such as a mobility management entity (MME) in the LTE core network updates a transmission path, that is, before step 411, when there is uplink or downlink data that needs to be transmitted, data transmission is first performed and then the transmission path is updated (because the UE has accessed the secondary access network device before the data is transmitted, the data transmission path may be modified, so that the data can be transmitted by using the secondary access network device). Such a case is described in the following step 409 to step 414.

Actually, after the UE accesses the secondary access network device, and after the core network device such as the MME in the LTE core network updates the transmission path, that is, after step 414, when there is uplink or downlink data that needs to be transmitted, data transmission is performed. In other words, step 411 to step 414 may be performed first, and then step 409 and step 410 are performed.

Step 409: The master access network MRAN device sends service data unit number status transfer (SN Status Transfer) information to the secondary access network SRAN device, where the data status transfer (SN Status Transfer) information is used to indicate a start location at which the secondary access network SRAN device receives data. An example of the data status transfer (SN Status Transfer) information is that the currently transmitted data includes n data packets, and the SRAN starts to receive data from an $m^{th}$ data packet in the data, for example, n=80, and m=50.

For example, the master access network MRAN device transmits, according to a preset control policy, a specific proportion of data by using the secondary access network SRAN device. For example, the control policy is that: when a local spectrum resource utilization rate of the master access network MRAN device is greater than 80%, some data is transmitted by using the secondary access network SRAN device.

Step 410: A serving gateway (S-GW) sends downlink data to the master access network MRAN device; the master access network MRAN device receives the downlink data, and offloads some of the downlink data to the secondary access network SRAN device; and the secondary access network device SRAN receives the downlink data. In addition, the secondary access network SRAN device determines, based on the received data status transfer (SN Status Transfer) information, a start location at which the secondary access network SRAN device needs to receive data, and receives the downlink data based on the start location.

Alternatively, the serving gateway S-GW separately sends downlink data to the master access network MRAN device and the secondary access network SRAN device, and the master access network MRAN device and the secondary access network SRAN device receive their respective downlink data based on start locations at which the MRAN and the SRAN separately need to receive data and that are in the data status transfer (SN Status Transfer) information.

It should be noted that downlink data transmission is used as an example in step 409 and step 410. Actually, an uplink data transmission method is the same as a downlink data transmission method. A difference lies in that the data is sent by the serving gateway to the access network device in the downlink data transmission, and the data is sent by a terminal to the access network device in uplink data transmission. Details are not described herein.

Step 411: The master access network MRAN device sends a request message for updating an evolved radio access bearer (E-RAB) parameter to the mobility management entity (MME) of the core network (EPC).

The mobility management entity MME is a control-plane node, and is mainly configured to perform mobility management, session management, load balancing, access control, and the like. A P-GW is a gateway of a packet data network (PDN), is a data-plane node, and is mainly configured to, for example, forward data.

An E-RAB is usually used to transmit data such as voice and a multimedia service between UE and a core network. Generally, the core network initiates setup of the E-RAB. After the E-RAB is successfully set up, the UE enters a service transmission process. There are a plurality of E-RAB parameters, for example, a quality of service class identifier (QCI) and an allocation and retention priority (ARP). The QCI is a reference scalar of a parameter related to an access network device, and is used to control a bearer-level data packet forwarding process. The ARP is mainly used to determine, based on a resource status, whether to accept or reject a bearer setup or modification request. Actually, there are a plurality of existing E-RAB parameters, which are not listed one by one herein.

In an example, the request message for updating an E-RAB parameter includes an addition indication parameter, where the indication parameter is used to indicate whether the core network establishing a connection to the UE is an LTE core network EPC or a 5G core network new RAT CN.

In an example, the request message for updating an E-RAB parameter further includes an addition parameter Slice ID, where the parameter Slice ID is used to indicate an ID of a slice corresponding to the UE. For example, the ID of the slice of the UE is 3.

In an example, the request message for updating an E-RAB parameter further includes updating parameters, i.e., E-RAB Level QoS Parameters. E-RAB Level QoS Parameters are used to represent values of QoS parameters corresponding to each E-RAB level. To be specific, each E-RAB level is corresponding to a group of QoS parameters, that is, E-RAB Level QoS Parameters indicate a group of QoS parameters. Further, updating E-RAB Level QoS Parameters is adding one or more of the following parameters: a security level, a service continuity level, a delay level, a flow priority indicator FPI, a reflective quality of service indicator RQI, a packet drop priority indicator PDPI, and a traffic filter template TFT. For example, the request message for updating an E-RAB parameter is to add a parameter: a security level of 3.

Step 412: The MME updates the evolved radio access bearer E-RAB parameter, for example, the MME adds a parameter EPC or new RAT CN, and feeds back an update result to the S-GW, so that the S-GW delivers data to the UE based on an updated transmission path.

Step 413: The S-GW sends, to the master access network MRAN device based on the updated data transmission path, information for ending data packet sending, for example, sends a data packet with a sending data end marker (end marker packet), so as to notify the master access network MRAN device that data transmission has ended. After receiving the information for ending data packet sending, the master access network MRAN device sends, to the secondary access network SRAN device, the information for ending data packet sending, for example, sends the data packet with a sending data end marker (end marker packet), so as to notify the secondary access network SRAN device that the data transmission has ended.

Step 414: The MME sends an E-RAB parameter update complete acknowledgment message (End Marker Packet) to the master access network MRAN device, so as to notify the master access network MRAN device that the data transmission path has been updated.

A person skilled in the art may understand that step 401 to step 414 use an example in which the core network connected to the UE is the LTE core network EPC. Therefore, the control-plane node is the MME, and the data-plane node is the S-GW. Actually, the core network connected to the UE may alternatively be a 5G core network New RAT CN. In this case, the control-plane node is a New RAT MME, and the data-plane node is a New RAT S-GW.

Figure 5:
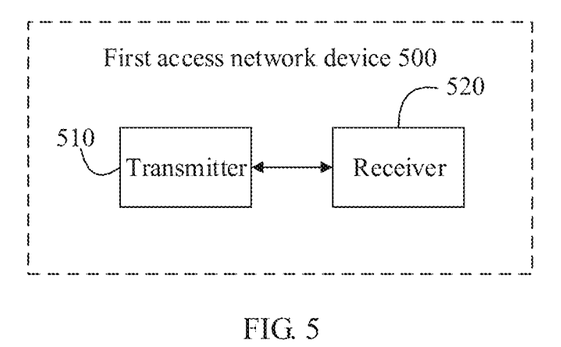
FIG. 5 is a schematic diagram of an access network device according to an embodiment of this application.

FIG. 5 is a schematic diagram of a first access network device 500 according to an embodiment of this application. The first access network device 500 may perform the method and steps performed by the foregoing master access network MRAN device.

In FIG. 5, the first access network device 500 includes a transmitter 510 and a receiver 520.

The transmitter 510 is configured to send a request message to a second access network device, where the request message is used to request the second access network device to serve as a secondary access network device of a terminal served by the first access network device.

The receiver 520 is configured to receive an acknowledgment message from the second access network device, where the acknowledgment message is used to acknowledge to the first access network device that the second access network device agrees to serve as the secondary access network device of the terminal.

In an example, the acknowledgment message further includes at least one of an identifier of a downlink tunnel between the second access network device and the core network or an identifier of an uplink tunnel between the second access network device and the core network.

In an example, the request message further includes an identifier of a core network device corresponding to the first access network device 500.

In an example, the request message further includes one or more of the following quality of service QoS attributes: a security level, a service continuity level, a delay level, a flow priority indicator FPI, a reflective quality of service indicator RQI, a packet drop priority indicator PDPI, and a traffic filter template TFT.

In an example, the request message further includes an identifier of a network slice accessed by the terminal, and the identifier of the network slice is corresponding to one or more of the QoS attributes.

It should be noted that the first access network device 500 in FIG. 5 may perform the steps performed by the master access network MRAN device in the method embodiment shown in FIG. 4, including step 402, step 403, step 405, step 407, step 409, step 410, step 411, and step 413, and details are not described herein.

Figure 6:
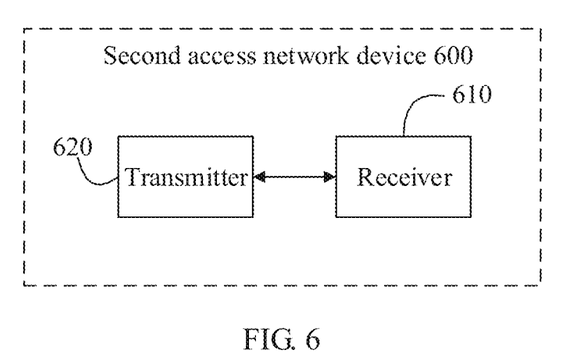
FIG. 6 is a schematic diagram of another access network device according to an embodiment of this application.

FIG. 6 is a second access network device 600 according to an embodiment of this application. The second access network device 600 may perform the method and the steps performed by the foregoing secondary access network SRAN device.

In FIG. 6, the second access network device 600 includes a receiver 610 and a transmitter 620.

The receiver 610 is configured to receive a request message from a first access network device, where the request message is used to request the second access network device to serve as a secondary access network device of a terminal served by the first access network device.

The transmitter 620 is configured to send an acknowledgment message to the first access network device, where the acknowledgment message is used to acknowledge to the first access network device that the second access network device agrees to serve as the secondary access network device of the terminal.

In an example, the acknowledgment message further includes at least one of an identifier of a downlink tunnel between the second access network device and the core network or an identifier of an uplink tunnel between the second access network device and the core network.

In an example, the request message further includes an identifier of a core network device corresponding to the first access network device.

In an example, the request message further includes one or more of quality of service QoS attributes: a security level, a service continuity level, a delay level, a flow priority indicator FPI, a reflective quality of service indicator RQI, a packet drop priority indicator PDPI, and a traffic filter template TFT.

In an example, the request message further includes an identifier of a network slice accessed by the terminal, and the identifier of the network slice is corresponding to one or more of the QoS attributes.

It should be noted that the master access network device 600 in FIG. 6 may perform the steps performed by the secondary access network SRAN device in the method embodiment shown in FIG. 4, including step 404, step 410, step 413, and the like, and details are not described herein.

A controller/processor configured to perform functions of the access network device, the UE, or the core network apparatus in this application may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

Method or algorithm steps described in combination with the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, an hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement or improvement made based on the technical solutions of this application shall fall within the protection scope of this application.

What is claimed is:

1. A dual connectivity method, wherein the method comprises:
    sending, by a first access network device, a request message to a second access network device, wherein the request message requests the second access network device to serve as a secondary access network device of a terminal served by the first access network device, wherein the request message comprises an identifier of a network slice accessed by the terminal, and wherein the network slice corresponds to a bearer and the identifier of the network slice is associated with one or more of quality of service (QoS) attributes of the bearer; and
    receiving, by the first access network device, an acknowledgment message from the second access network device, wherein the acknowledgment message acknowledges to the first access network device that the second access network device serves as the secondary access network device of the terminal.

2. The method according to claim 1, wherein the request message further comprises one or more of the following QoS attributes:
    a security level;
    a service continuity level;
    a delay level;
    a flow priority indicator (FPI);
    a reflective quality of service indicator (RQI);
    a packet drop priority indicator (PDPI); and
    a traffic filter template (TFT).

3. A dual connectivity method, wherein the method comprises:
    receiving, by a second access network device, a request message from a first access network device, wherein the request message requests the second access network device to serve as a secondary access network device of a terminal served by the first access network device, wherein the request message comprises an identifier of a network slice accessed by the terminal, and wherein the network slice corresponds to a bearer and the identifier of the network slice is associated with one or more of quality of service (QoS) attributes of the bearer; and
    sending, by the second access network device, an acknowledgment message to the first access network device, wherein the acknowledgment message acknowledges to the first access network device that the second access network device serves as the secondary access network device of the terminal.

4. The method according to claim 3, wherein the request message further comprises one or more of the following QoS attributes:
    a security level;
    a service continuity level;
    a delay level;
    a flow priority indicator (FPI);
    a reflective quality of service indicator (RQI);
    a packet drop priority indicator (PDPI); and
    a traffic filter template (TFT).

5. A first access network device, comprising at least one processor, and one or more memories coupled to the at least one processor and storing programming instructions for execution by the least one processor to cause the first access network device to:
    send a request message to a second access network device, wherein the request message requests the second access network device to serve as a secondary access network device of a terminal served by the first access network device, wherein the request message comprises an identifier of a network slice accessed by the terminal, and wherein the network slice corresponds to a bearer and the identifier of the network slice is associated with one or more of quality of service (QoS) attributes of the bearer; and
    receive an acknowledgment message from the second access network device, wherein the acknowledgment message acknowledges to the first access network device that the second access network device serves as the secondary access network device of the terminal.

6. The first access network device according to claim 5, wherein the request message further comprises one or more of the following QoS attributes:
   a security level;
   a service continuity level;
   a delay level;
   a flow priority indicator (FPI);
   a reflective quality of service indicator (RQI);
   a packet drop priority indicator (PDPI); and
   a traffic filter template (TFT).

7. A second access network device, comprising at least one processor, and one or more memories coupled to the at least one processor and storing programming instructions for execution by the least one processor to cause the second access network device to:
   receive a request message from a first access network device, wherein the request message requests the second access network device to serve as a secondary access network device of a terminal served by the first access network device, wherein the request message further comprises an identifier of a network slice accessed by the terminal, and wherein the network slice corresponds to a bearer and the identifier of the network slice is associated with one or more of quality of service (QoS) attributes of the bearer; and
   send an acknowledgment message to the first access network device, wherein the acknowledgment message acknowledges to the first access network device that the second access network device serves as the secondary access network device of the terminal.

8. The second access network device according to claim 7, wherein the request message further comprises one or more of the following QoS attributes:
   a security level;
   a service continuity level;
   a delay level;
   a flow priority indicator (FPI);
   a reflective quality of service indicator (RQI);
   a packet drop priority indicator (PDPI); and
   a traffic filter template (TFT).

9. The method according to claim 4, wherein the method further comprises:
   receiving, by the second access network device, the one or more of the QoS attributes associated with the identifier of the network slice from an operation administration and maintenance (OAM) device.

10. The second access network device according to claim 8, wherein the programming instructions are for execution by the least one processor to cause the second access network device to:
    receive the one or more of the QoS attributes associated with the identifier of the network slice from an operation administration and maintenance (OAM) device.

11. The method according to claim 1, wherein the request message is a secondary access network device addition request (SRAN Addition Request) message.

12. The method according to claim 1, wherein the acknowledgment message is a secondary access network addition request acknowledgment (SRAN Addition Request Acknowledge) message.

13. The method according to claim 3, wherein the request message is a secondary access network device addition request (SRAN Addition Request) message.

14. The method according to claim 3, wherein the acknowledgment message is a secondary access network addition request acknowledgment (SRAN Addition Request Acknowledge) message.

15. The first access network device according to claim 5, wherein the request message is a secondary access network device addition request (SRAN Addition Request) message.

16. The first access network device according to claim 5, wherein the acknowledgment message is a secondary access network addition request acknowledgment (SRAN Addition Request Acknowledge) message.

17. The second access network device according to claim 7, wherein the request message is a secondary access network device addition request (SRAN Addition Request) message.

18. The second access network device according to claim 7, wherein the acknowledgment message is a secondary access network addition request acknowledgment (SRAN Addition Request Acknowledge) message.

19. A system, comprising a first access network device and a second network device, wherein:
    the first access network device comprises at least one first processor and one or more first memories coupled to the at least one first processor and storing programming instructions for execution by the least one first processor to cause the first access network device to:
       send a request message to the second access network device, wherein the request message requests the second access network device to serve as a secondary access network device of a terminal served by the first access network device, wherein the request message comprises an identifier of a network slice accessed by the terminal, and wherein the network slice corresponds to a bearer and the identifier of the network slice is associated with one or more of quality of service (QoS) attributes of the bearer; and
       receive an acknowledgment message from the second access network device, wherein the acknowledgment message acknowledges to the first access network device that the second access network device serves as the secondary access network device of the terminal; and
    the second access network device comprises at least one second processor and one or more second memories coupled to the at least one second processor and storing programming instructions for execution by the least one second processor to cause the second access network device to:
       receive the request message from the first access network device, wherein the request message requests the second access network device to serve as the secondary access network device of the terminal served by the first access network device, wherein the request message further comprises the identifier of a network slice accessed by the terminal, and wherein the network slice corresponds to the bearer and the identifier of the network slice is associated with one or more of the QoS attributes of the bearer; and
       send the acknowledgment message to the first access network device, wherein the acknowledgment message acknowledges to the first access network device that the second access network device serves as the secondary access network device of the terminal.

20. The system according to claim 19, wherein the request message further comprises one or more of the following QoS attributes:

a security level;
a service continuity level;
a delay level;
a flow priority indicator (FPI);
a reflective quality of service indicator (RQI);
a packet drop priority indicator (PDPI); and
a traffic filter template (TFT).

\* \* \* \* \*